(12) United States Patent
Hecock, Jr.

(10) Patent No.: US 6,244,651 B1
(45) Date of Patent: Jun. 12, 2001

(54) PICKUP TRUCK BED CAP

(76) Inventor: Richard H. Hecock, Jr., 28490 Mound Rd. Apt. 8A, Warren, MI (US) 48092

( * ) Notice: Subject to any disclaimer, the term of this patent is extended or adjusted under 35 U.S.C. 154(b) by 0 days.

(21) Appl. No.: 09/059,980

(22) Filed: Apr. 14, 1998

(51) Int. Cl.[7] ........................................................ B60P 7/02
(52) U.S. Cl. .................................. 296/100.12; 296/100.11
(58) Field of Search ........................ 296/100.01, 100.02, 296/100.03, 100.05, 100.11, 100.12, 100.17, 100.18

(56) References Cited

U.S. PATENT DOCUMENTS

| | | |
|---|---|---|
| 4,397,497 | 8/1983 | Alonzo, Jr. et al. . |
| 4,789,196 | * 12/1988 | Fields ................................ 296/100.18 |
| 5,056,855 | * 10/1991 | Moravsky ..................... 296/100.02 X |
| 5,203,364 | * 4/1993 | Koole ........................... 296/100.03 X |
| 5,203,603 | 4/1993 | Hertzberg et al. . |
| 5,263,757 | 11/1993 | Reed . |
| 5,443,295 | 8/1995 | Moberly . |
| 5,464,264 | 11/1995 | Wilson . |
| 5,516,182 | 5/1996 | Aragon et al. . |
| 5,531,497 | * 7/1996 | Cheng ........................... 296/100.11 X |
| 5,845,957 | * 12/1998 | Hurst ............................... 296/100.12 |

* cited by examiner

Primary Examiner—Joseph D. Pape
(74) Attorney, Agent, or Firm—Kenneth L Tolar

(57) ABSTRACT

The present invention relates to a vertically and horizontally collapsible truck bed cap including a planar platform attached to the truck bed adjacent the cab. Vertically depending from the upper surface of the platform are a plurality of extendable hydraulic cylinders which support a rigid cover member. The cover member has a substantially inverted U-shaped vertical cross section with top and front walls and two parallel spaced side walls vertically depending therefrom which rest on the hydraulic cylinders. A canopy member is received within the cover member a portion of which is peripherally attached thereto while the remaining portion is extendable therefrom. The canopy is supported in an extended or retracted position by a frame structure including a plurality of spring loaded, horizontally telescoping rods attached to the cover member front wall. The rods may be locked in a retracted position by a release button and key lock mechanism in communication therewith. A tool box is removably attached to the platform providing additional storage for hand tools and similar items. The lower telescoping rods have rollers at a distal end for rollably engaging a track mechanism on each truck bed sidewall.

14 Claims, 3 Drawing Sheets

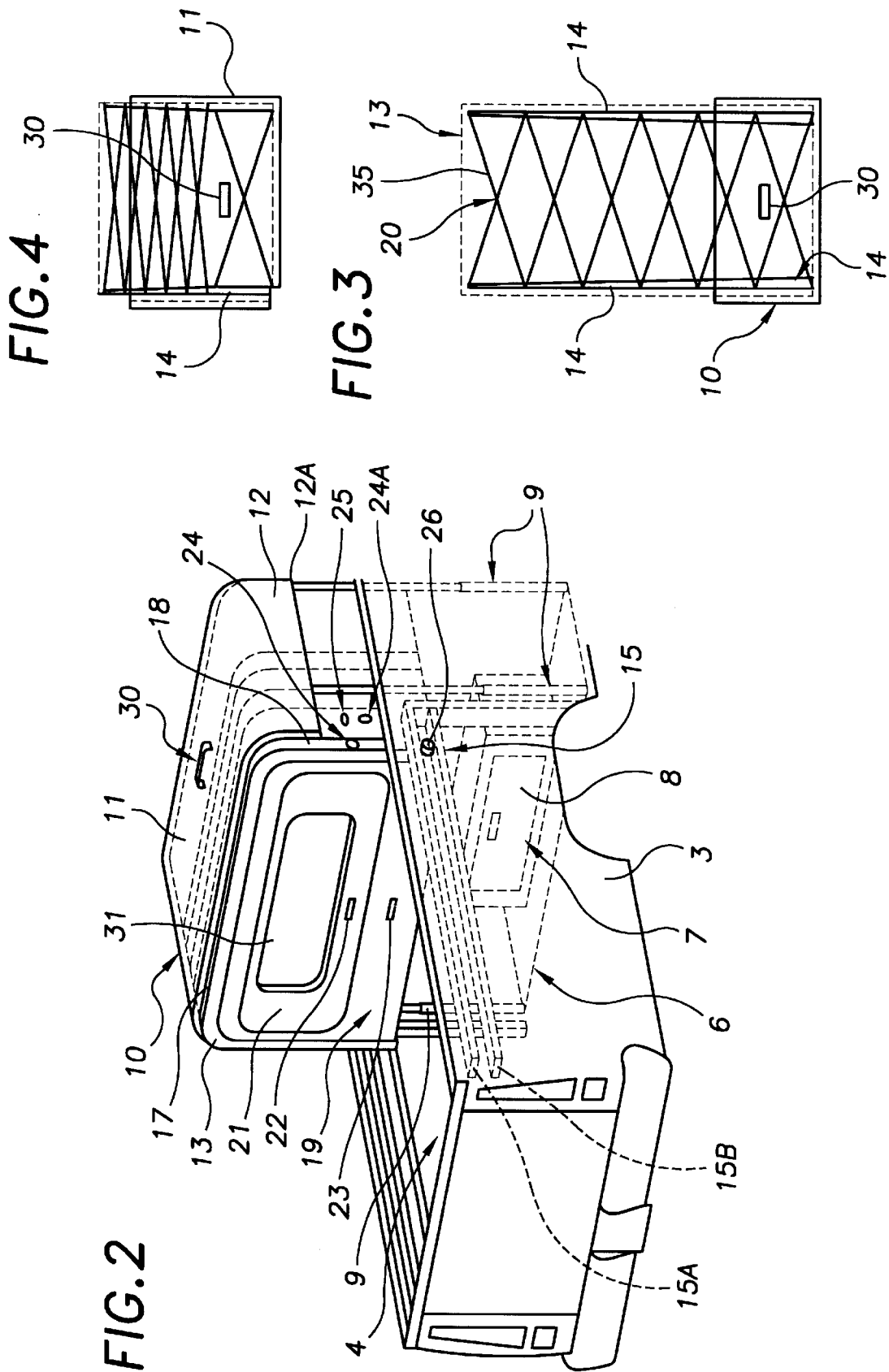

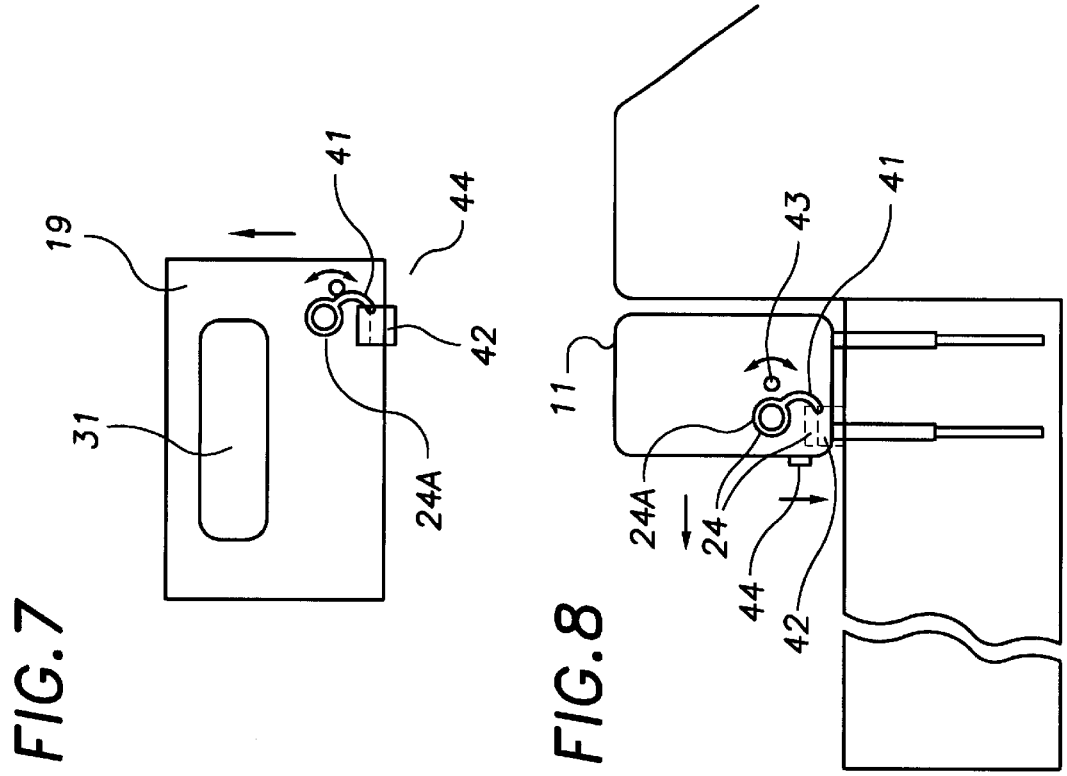
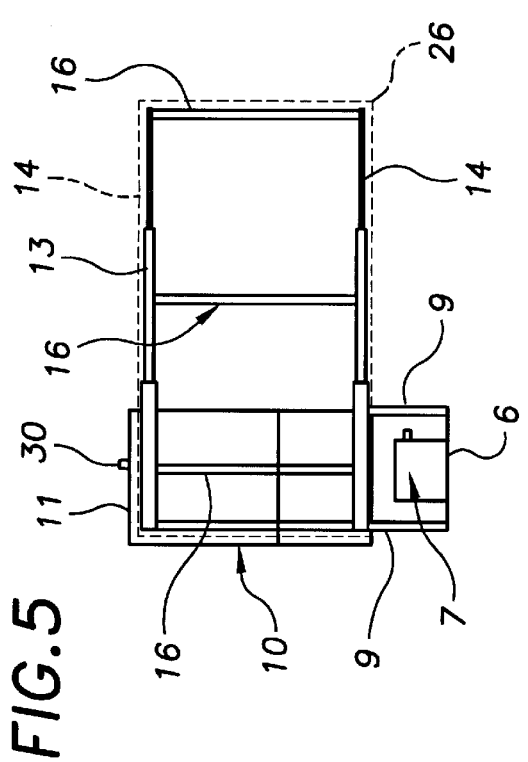
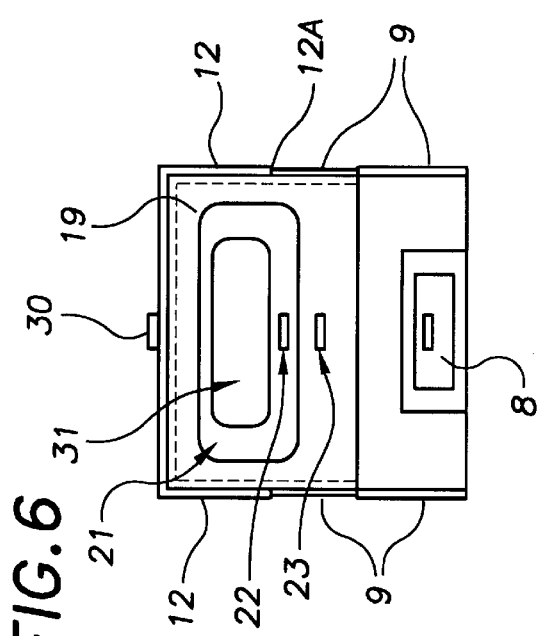

PICKUP TRUCK BED CAP

BACKGROUND OF THE INVENTION

The present invention relates to a utility cover for the bed of a pickup truck, and more specifically, a vertically and horizontally collapsible cover suspended from a support platform that is mounted to the truck bed.

DESCRIPTION OF THE PRIOR ART

Pickup truck beds have been used for years to store and transport a variety of items such as tools and various other cargo. However, because the bed is open, any cargo contained therein may be easily stolen, vandalized or damaged by wind and rain. Numerous pickup truck bed covers, tents and caps have been previously designed in an attempt to solve this problem. For example, U.S. Pat. No. 5,263,757 issued to Reed relates to a cargo box mounted to an annular plate secured to the rear window. The box is supported by a horizontal rigid bar.

U.S. Pat. No. 5,516,182 issued to Aragon relates to a retractable top for a pickup truck bed including an elongated canopy securable over the bed of the pickup truck. The canopy comprises a plurality of telescopically mated rigid sections each having a generally C-shaped vertical cross section. Each canopy section has a plurality of rollers extending from the bottom edge of each side wall that slide within a track mechanism on the side walls of the pickup truck. An electrical drive mechanism is coupled to the track and roller mechanisms for extending and retracting the canopy.

U.S. Pat. No. 5,464,264 issued to Wilson relates to a pickup truck cargo bed built by the truck manufacturer including movable panels which allow the cargo bed to be interchangeably converted from a partially enclosed small cargo storage compartment to a fully open truck bed.

U.S. Pat. No. 5,203,603 issued to Hertzberg et al relates to a telescopic camper cap comprising a fixed cover member mounted to the top of the bed sidewalls, at least one movable cover member telescopingly received therein and a track assembly mounted on the walls within which dowels on each cover member are slidably received.

U.S. Pat. No. 4,397,497 issued to Alonzo, Jr. et al relates to an expandable camper body for use in a pickup truck including two units. A front unit is fastened to the truck bed side rails and a back unit is telescopingly received within the front unit that, when fully extended, completely overlaps the tailgate. The back unit has two tailgate portions. The upper tailgate locks to the truck side walls and the lower tailgate pivots and locks to the truck bed so as to provide a camper unit or an open bed pickup truck as desired.

U.S. Pat. No. 5,443,295 issued to Moberly relates to a collapsible cap for a pickup truck including a pair of track members mounted to the side walls of the pickup truck and a series of collapsible frame members mounted to the track members.

Although numerous collapsible pickup truck bed caps exist in the prior art, these devices are inadequate for several reasons. The previously designed collapsible units may only be collapsed horizontally against the truck cab. In the collapsed position, the cap still fully extends vertically which is unsightly and increases the risk of the cap shifting when the vehicle is moving. Accordingly, the only alternative is to completely remove the cover which is time consuming and laborious. Furthermore, the horizontally collapsible devices are manually slid within a track mechanism and are difficult and cumbersome to retract. The present invention relates to both a vertically and horizontally collapsible truck bed cap which may be selectively locked in a retracted position preventing unauthorized users from manipulating the device. A canopy portion is supported by spring loaded, horizontally telescoping frame members which facilitate the expansion thereof. Additionally, the vertical support members depend from a fixed platform mounted to the pickup truck bed having a tool box removably attached thereto.

SUMMARY OF THE INVENTION

The present invention relates to a unique pickup truck bed cap which may be vertically and horizontally collapsed within the pickup truck bed. The device comprises a planar platform attached to the truck bed, preferably adjacent the passenger cab. The platform has a tool box removably attached thereto. Two opposing pairs of vertically extendable hydraulic support legs each vertically depend from the platform. The cover member is further supported by a plurality of inverted U-shaped frame members. The cover member surrounds a flexible canopy member and is attached to a portion thereof. The canopy is supported by a frame structure which includes two opposing pairs of horizontally telescoping, spring loaded arms received within the cover member allowing the canopy member to be horizontally extended or retracted as desired. The cover member is further supported by a plurality of inverted U-shaped frame members. Each lower telescoping arm has a roller at a distal end for rollably engaging a track mechanism attached to a truck bed sidewall allowing the device to easily slide horizontally therealong. The roof portion of the canopy member is further supported with a collapsible, accordion style frame comprising a plurality of collapsible X-shaped frame members disposed between and attached to the opposing upper arms. It is therefore an object of the present invention to provide a pickup truck cap that is both vertically and horizontally collapsible.

It is yet another object of the present invention to provide a pickup truck cap depending from a platform having a tool box mounted thereon.

It is yet another object of the present invention to provide a pickup truck cap that is easily and conveniently extended or retracted.

It is yet another object of the present invention to provide a pickup truck cap that may be selectively locked in a retracted position. Other objects, features and advantages of the present invention will become readily apparent from the following detailed description of the preferred embodiment when considered with attached drawings and the appended claims.

BRIEF DESCRIPTION OF THE DRAWINGS

FIG. 2 depicts the inventive device in a horizontally retracted position with several of the internal components depicted in phantom.

FIG. 3 depicts a top view of the frame components in an extended position.

FIG. 4 depicts a top view of the frame components in a collapsed position.

FIG. 5 depicts a side view of the frame components in an extended position.

FIG. 6 depicts a rear view of the inventive device.

FIG. 7 depicts the rear lock assembly.

FIG. 8 depicts the side mounted lock assembly.

DESCRIPTION OF THE PREFERRED EMBODIMENT

Figure 1:
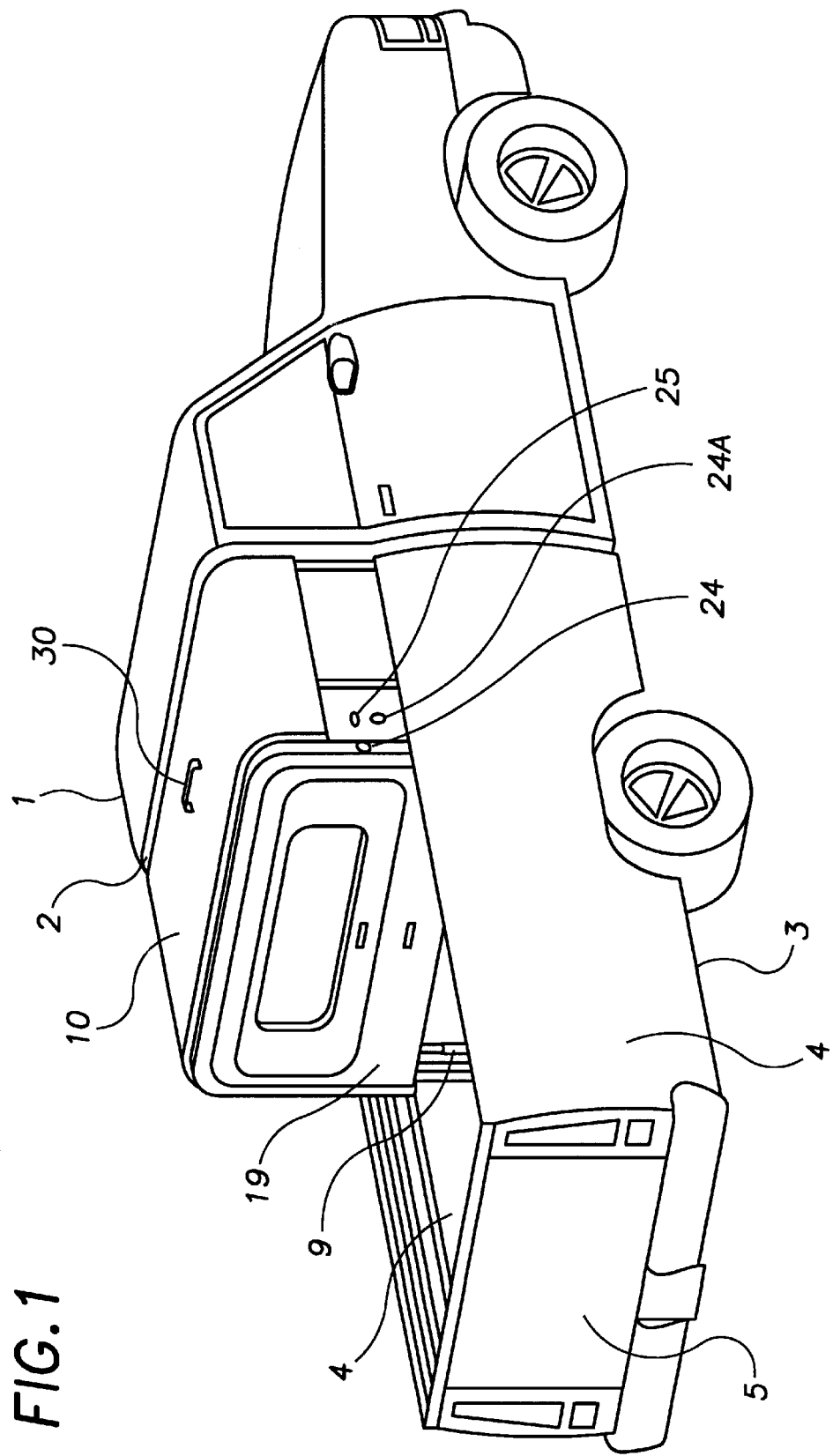
FIG. 1 depicts the inventive device in a horizontally retracted and vertically extended position.

Referring now to FIGS. 1 through 8, the present invention relates to a cap for covering the bed of a pickup truck. A pickup truck generally includes a cab 1 having a rear wall 2, a bed 3 extending horizontally from said rear wall 2, a pair of parallel side walls 4 vertically depending from said bed with a rear tailgate 5 disposed therebetween which is substantially parallel to said rear wall.

The present invention relates to a cap for attaching to the truck bed side walls 4 and includes a substantially planar platform 6 rigidly attached to the pickup truck bed immediately adjacent the cab rear wall. The platform 6 is substantially rectangular with four peripheral edges, four corners therebetween and an upper surface and a lower surface. The platform may be affixed to the bed using any conventional attachment means such as bolts, screws, welding, etc. A slide drawer type tool box 7 is removably affixed to the platform for storing tools and similar items. The tool box 7 is box shaped and has one or more storage drawers 8 slidably removable therefrom.

Vertically depending from the upper surface of the platform are four vertically telescoping hydraulic legs 9 of the type generally known in the prior art. Preferably, each leg 9 is proximal a corner of the platform and immediately adjacent the inwardly facing side of a bed sidewall. The legs are what are commonly referred to as hydraulic cylinders and typically have an integral release means for selectively extending or retracting the cylinders.

The hydraulic legs 9 support a cover member 10 having a substantially inverted U-shaped vertical cross section including a horizontal top wall 11 with two opposing spaced side walls 12 vertically depending therefrom and a front wall adjacent to the cab rear wall. On the top wall 11 of the cover member 10 is a handle 30 to be grasped by a user. The terminal edge 12A of each cover member side wall 12 rests on a pair of hydraulic legs.

Received within the cover member with a portion attached thereto is a flexible canopy member 13. The canopy member 13 is supported by a horizontally collapsible frame structure and has a substantially inverted U-shaped vertical cross section. The canopy includes a roof portion 17, a pair of side walls integrally depending therefrom 18 and a rear panel 19 therebetween.

The frame structure includes four horizontally telescoping spring loaded arms 14 received within said cover member and said canopy member, including an upper and lower arm adjacent a canopy cover member sidewall with a second upper and lower arm adjacent the opposing sidewall. The arms may be secured to the inner surfaces of the canopy member sidewalls using any suitable attachment means such as hooks, sleeves, tie straps, velcro and similar devices. Preferably, a first end of each telescoping arm is welded or otherwise permanently affixed to the front wall of the cover member. Each of the opposing lower arms have a roller 26 at a second end for rollably engaging a track mechanism 15 disposed on the interior surface of the pickup truck bed sidewalls. The upper arms are supported by one or more inverted U-shaped frame members 16 providing additional structural integrity thereto.

The track mechanism 15 includes an elongated upper track member 15A and an elongated lower track member 15B each having facing surfaces with a longitudinal groove thereon. The rollers are disposed between the two track members and rollably engage the longitudinal grooves.

The roof portion 17 of the canopy member is supported by an upper frame member 20 including a plurality of juxtaposed X-shaped collapsible frame members 35. Each X-shaped frame member has two opposing pairs of terminal ends that are selectively pivotable between an adjacent and a spaced position. A pair of terminal ends are attached to an upper arm and the opposing pair is attached to the opposing arm whereby the X-shaped frame members collapse as the arms are retracted as depicted in FIG. 4. The collapsible upper frame member and side arms allow the canopy member to be horizontally collapsed into or expanded out of the cover member.

The rear panel 19 of the canopy member has a hingedly engaging door 21 with a handle 22 attached thereto allowing selective access to the cap interior. The door has a transparent window 31 integral therewith. A similar window 40 is disposed on the front wall of the cover member which selectively aligns with the cab rear window when the device is in a vertically extended position. Therefore, a driver can see through the device to view objects behind the vehicle. Immediately below the hingedly engaging door is a second handle 23 to be grasped by a user when to pulling the assembly horizontally towards the rear of the pickup truck bed.

Two lock mechanisms are provided for securing the device. On a side wall of the cover member is a first lock mechanism 24 in communication with a key receptacle 24A for selectively locking the device in its horizontally collapsed position. The lock mechanism includes an arcuate arm 41 selectively rotatable with a key that seats within a latch assembly 42 attached to the bed sidewall. A spring loaded rod 43 having a slot thereon is disposed adjacent the key lock mechanism. When the arm is released from the latch, the spring loaded rod may be depressed allowing its slot to align with the arcuate arm rod causing the device to expand towards the rear of the cab. A second similar locking mechanism 44 is disposed on the rear panel of the canopy member that selectively operates in conjunction with a latch assembly secured to the truck bed. The second lock maintains the device in a vertically collapsed position.

To use the above described device, a user unlocks the second lock mechanism grasps the handle attached to the top portion of the cover member and pulls the unit upwardly until the hydraulic legs reach a fully extended position. Next, the user places the appropriate key into the first lock mechanism to unlock the release button and then depresses each release button to extend the telescoping frame. The spring loaded telescoping arms would then begin to automatically extend toward the tailgate. The user then grasps the handle on the rear panel of the canopy member and pulls the device until the spring loaded arms lock into their fully extended positions. To retract the device, the user collapses the canopy completely within the cover member until the spring loaded arms lock into their fully retracted position. Again, the first key lock mechanism is activated to prevent an unauthorized user from extending the device. Finally, the user again grasps the handle on the top portion of the cover member and pushes downwardly to retract the hydraulic leg supports and activates the second locking mechanism.

The canopy member is preferably made from a cloth material such as canvas, nylon fabric or a similar, durable weather resistant material. The window mounted on the rear panel of the canopy member and the front wall of the cover member may be constructed with acrylic, flexible vinyl or a suitable equivalent. The cover member is preferably constructed with plastic providing a rigid but lightweight enclosure for the canopy member and frame components. As will be readily apparent to those skilled in the art, however, the materials of construction of the various components may be varied without departing from the spirit of the present invention. Furthermore, the above described invention is not to be limited to the exact details of construction enumerated above. For example, four support legs and four spring loaded arms are shown and described. However, as will be readily apparent to those skilled in the art, any number of support legs or arms may be used.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. In combination with a pickup truck having a passenger cab with a rear wall, a flat bed extending horizontally from said cab rear wall, and a pair of parallel side walls vertically depending from said bed, a pickup truck bed cap comprising:

a substantially planar platform having an upper surface attached to the bed of said truck proximal said cab rear wall;

a plurality of vertically extendable support legs vertically depending from said upper surface of said platform;

a rigid cover member having a substantially inverted U-shaped vertical cross section including a top wall, a front wall and two opposing, spaced sidewalls vertically depending from said top wall said sidewalls having a terminal edge each resting on a pair of said plurality of support legs;

a horizontally extendable frame structure received within said cover member and attached to the cover front wall;

a flexible canopy member received within said cover member and overlaying said horizontally extendable frame structure, a portion of which is attached to said cover member with the remaining portion unattached and completely extendable and removable therefrom; said canopy having a roof portion, a pair of sidewalls integrally depending therefrom and a rear panel between said sidewalls;

a pair of elongated track mechanisms, each attached to the interior surface of one of the bed side walls;

a pair of roller mechanisms attached to said frame structure, each rollably engaging one of the track mechanisms.

2. A pickup truck bed cap according to claim 1 wherein said horizontally extendable frame structure comprises:

a first pair of horizontally telescoping, spring loaded arms including an upper and a lower arm each having first and second ends, the first end of each received within said cover member proximal a sidewall thereof;

a second pair of telescoping, spring loaded arms, including an upper and a lower arm each having first and second ends, the first end of each received within said cover member proximal the opposing sidewall of said cover member, the first ends of each arm attached to the front wall of said cover member;

a collapsible upper frame component attached to each of said upper arms and disposed therebetween for supporting the roof portion of said canopy member.

3. A pickup truck bed cap according to claim 1 wherein said roller mechanisms are attached to the second ends of each lower arm.

4. A pickup truck bed cap according to claim 1 wherein said frame structure further comprises a locking means for selectively locking said telescoping arms in a retracted position.

5. A pickup truck bed cap according to claim 1 wherein said canopy member further comprises a hingedly engaging door on its rear panel having a transparent window thereon.

6. A pickup truck bed cap according to claim 1 further comprising a tool box removably attached to the upper surface of said platform.

7. A pickup truck bed cap according to claim 1 further comprising a handle means attached to the exterior surface of the cover member top wall.

8. A pickup truck bed cap according to claim 1 further comprising a handle means attached to the rear panel of said cover member.

9. A pickup truck bed cap according to claim 1 wherein said vertically extendable support legs are hydraulic cylinders selectively movable between an extended and a retracted position.

10. A pickup truck bed cap according to claim 1 further comprising a handle means on the exterior surface of said door.

11. A pickup truck bed cap according to claim 2 wherein said collapsible frame component comprises:

a plurality of juxtaposed X-shaped frame members each having two opposing pairs of terminal ends that are selectively pivotable between an adjacent and a spaced position, with a pair of terminal ends attached to an upper arm of the horizontally extendable frame structure and the opposing pair of terminal ends attached to the opposing upper arm whereby said frame members collapse as said arms are retracted.

12. A pickup truck bed cap according to claim 2 further comprising:

at least one inverted U-shaped frame member received within said canopy member and beneath said collapsible upper frame component for providing additional structural integrity thereto.

13. A pickup truck bed cap according to claim 2 further comprising a second locking means for locking said vertically extendable support legs in a retracted position.

14. A pickup truck bed cap according to claim 1 wherein said cover member further includes a window on its front wall which aligns with a window on said cab rear wall when said bed cap is in a vertically extended position.

* * * * *